United States Patent Office 3,437,719
Patented Apr. 8, 1969

3,437,719
DYEABLE POLYPROPYLENE COMPOSITIONS
Nathan L. Zutty, Westfield, N.J., and Frank J. Welch and Edward M. Sullivan, Charleston, George M. Bryant, South Charleston, and Andred T. Walter, Charleston, W. Va., assignors to Union Carbide Corporation, a corporation of New York
No Drawing. Original application Dec. 27, 1963, Ser. No. 334,045, now Patent No. 3,355,440, dated Nov. 28, 1967. Divided and this application Apr. 28, 1967, Ser. No. 634,486
Int. Cl. C08f 29/02; D01f 7/02
U.S. Cl. 260—897
35 Claims

ABSTRACT OF THE DISCLOSURE

Dyeable polypropylene compositions prepared by blending polypropylene with a copolymer of a vinylphosphine oxide with ethylene or with an alkoxyethyl acrylate. If desired a magnesium chloride complex of the vinylphosphine oxide can be employed in lieu of the vinylphosphine oxide itself.

---

This application is a division of application Ser. No. 334,045, filed Dec. 27, 1963, now U.S. Letters Patent 3,355,440, which is a continuation-in-part of application Ser. No. 189,313, filed Apr. 23, 1962, now U.S. Letters Patent 3,402,222, application Ser. No. 189,267, filed Apr. 23, 1962, now abandoned, and application Ser. No. 319,993, filed Oct. 20, 1963.

This invention relates to polypropylene compositions having improved dye-receptability, and to novel copolymers employed in such compositions.

Polypropylene has found widespread use in the production of films and fibers. However, one serious drawback to the use of polypropylene in these and other applications is its inability to receive common dyes. This serious disadvantage has severely restricted the use of polypropylene and prevented its full commercial exploitation.

Various attempts have been made to solve this problem, but these usually have proven unsuccessful for one reason or another. Now, however, in accordance with the instant invention, it has been discovered, that polypropylene compositions having excellent dyeability and printability can be prepared by blending polypropylene with a copolymer of a vinylphosphine oxide with ethylene or with an alkoxyethyl acrylate. The compositions produced by such procedure are characterized by improved dyeability and printability than the polypropylene from which they are produced, while the other physical properties of the polypropylene, such as, for example, stiffness, tensile strength, elongation and dielectric strength, heat and light stability, etc., do not appear to undergo any significant deterioration.

The compositions of the instant invention are produced by mixing a copolymer of the type herein described with polypropylene to produce a homogeneous blend of the two polymers. Blending can be effected by any conventional means, such as by means of a two-roll mill or a Banbury mixer, or by the use of a common solvent for the two polymers. When a two-roll mill or a Banbury mixer is employed, blending can be easily effected at temperatures above the melting point of the polymers, for example, from about 160° C. to about 225° C., preferably from about 165° C. to about 175° C. The polypropylene employed is solid and preferably has a melt index of from about 0.1 decigram/minute to about 100 decigrams/minute at 230° C., and a density greater than about 0.89 gram/cc. If desired, fillers, antioxidants, heat stabilizers, light stabilizers, and other additives can be added to the blend.

The modifying copolymers employed in the instant invention are obtained by copolymerizing a vinylphosphine oxide with ethylene or an alkoxyethyl acrylate.

The vinylphosphine oxides which can be employed in producing the modifying copolymers employed in the instant invention can be represented by the formula

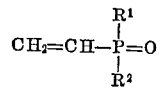

wherein $R^1$ and $R^2$ are monovalent hydrocarbon radicals free of aliphatic unsaturation, such as alkyl and aryl, containing from 1 to 14 carbon atoms, preferably from 1 to 6 carbon atoms. If desired a magnesium chloride complex of the vinylphosphine oxide can be employed in lieu of the vinylphosphine oxide itself. These complexes can be represented by the formula

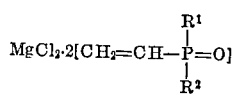

wherein $R^1$ and $R^2$ are as above defined. These complexes can be readily prepared by reacting magnesium chloride with a suitable vinylphosphine oxide in accordance with the technique disclosed in application Ser. No. 319,992, entitled "Coordination Complexes of Vinylphosphine Oxides and Metal Salts, and Polymers Thereof," filed Oct. 30, 1963, by Frank J. Welch and Herbert J. Paxton, Jr., which disclosure is incorporated herein by reference.

Among the vinylphosphine oxides which can be employed as comonomers are vinyldimethylphosphine oxide,
vinyldiethylphosphine oxide,
vinylmethylethylphosphine oxide,
vinyldipropylphosphine oxide,
vinyldiisopropylphosphine oxide,
vinyldibutylphosphine oxide,
vinyldiisobutylphosphine oxide,
vinyl-di-tertiary-butylphosphine oxide,
vinyldipentylphosphine oxide,
vinyldiisopentylphosphine oxide,
vinyl-di-tertiary-pentylphosphine oxide,
vinyldihexylphosphine oxide,
vinyldicyclohexylphosphine oxide,
vinyldi-(2-methylpentyl)-phosphine oxide,
vinyldiheptylphosphine oxide,
vinyldioctylphosphine oxide,
vinyldi-(2-ethylhexyl)phosphine oxide,
vinyldinonylphosphine oxide,
vinyldidecylphosphine oxide,
vinyldihendecylphosphine oxide,
vinyldidodecylphosphine oxide,
vinylditridecylphosphine oxide,
vinylditetradecylphosphine oxide,
vinyldibenzylphosphine oxide,
vinyldiphenethylphosphine oxide,
vinyldi-(p-methylbenzyl)phosphine oxide,
vinyldiphenylphosphine oxide,
vinyldi-(p-methylphenyl)phosphine oxide,
vinyldi-(2,3-dimethylphenyl)phosphine oxide,
vinyldinaphthylphosphine oxide,
vinyldi-(p-ethylphenyl)phosphine oxide,
vinyldi(3-methylnaphthyl)phosphine oxide,
vinyldi-(2,3-dimethylnaphthyl)phosphine oxide,
magnesium chloride-vinyldimethylphosphine oxide complex,
magnesium chloride vinyldiethylphosphine oxide complex,
magnesium chloride-vinylmethylethylphosphine oxide complex, magnesium chloride-vinyldipropylphosphine oxide complex,
magnesium chloride-vinyldiisopropylphosphine oxide complex,
magnesium chloride-vinyldibutylphosphine oxide complex,
magnesium chloride-vinyldiisobutylphosphine oxide complex,
magnesium chloride-vinyl-di-tertiary butylphosphine oxide complex,
magnesium chloride-vinyldipentylphosphine oxide complex,
magnesium chloride-vinyldiisopentylphosphine oxide complex,
magnesium chloride-vinyl-di-tertiary-pentylphosphine oxide complex,
magnesium chloride-vinyldihexylphosphine oxide complex,
magnesium chloride-vinyldicyclohexylphosphine oxide complex,
magnesium chloride-vinyldi-(2-methylpentyl)phosphine oxide complex,
magnesium chloride-vinyldiheptylphosphine oxide complex,
magnesium chloride-vinyldioctylphosphine oxide complex,
magnesium chloride-vinyldi-(2-ethylhexyl)phosphine oxide complex,
magnesium chloride-vinyldinonylphosphine oxide complex,
magnesium chloride-vinyldidecylphosphine oxide complex,
magnesium chloride-vinyldihendecylphosphine oxide complex,
magnesium chloride-vinyldidodecylphosphine oxide complex,
magnesium chloride-vinylditridecylphosphine oxide complex,
magnesium chloride-vinyl-ditetradecylphosphine oxide complex,
magnesium chloride-vinyldibenzylphosphine oxide complex,
magnesium chloride-vinyldiphenethylphosphine oxide complex,
magnesium chloride-vinyldi-(p-methylbenzyl)phosphine oxide complex,
magnesium chloride-vinyldiphenylphosphine oxide complex,
magnesium chloride-vinyldi-(p-methylphenyl)phosphine oxide complex,
magnesium chloride-vinyldi-(2,3-dimethylphenyl) phosphine oxide complex,
magnesium chloride-vinyldinaphthylphosphine oxide complex,
magnesium chloride-vinyldi-(p-ethylphenyl)phosphine oxide complex,
magnesium chloride-vinyldi-(3-methylnaphthyl) phosphine oxide complex,
magnesium chloride-(2,3-dimethylnaphthyl)phosphine oxide complex, and the like.

The alkoxyethyl acrylates which can be employed in producing the modifying copolymers employed in the instant invention can be represented by the formula

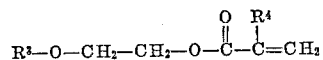

wherein $R^3$ is an alkyl radical containing from 1 to about 30 carbon atoms, preferably from about 1 to about 12 carbon atoms, and $R^4$ is a hydrogen or methyl radical. Illustrative of the alkoxyethyl acrylates which can be employed are such compounds as 2-methoxyethyl acrylate,
2-methoxyethyl methacrylate,
2-ethoxyethyl acrylate,
2-ethoxyethyl methacrylate,
2-n-propoxyethyl acrylate,
2-n-propoxyethyl methacrylate,
2-isopropoxyethyl acrylate,
2-isopropoxyethyl methacrylate,
2-n-butoxyethyl acrylate,
2-n-butoxyethyl methacrylate,
2-isobutoxyethyl acrylate,
2-isobutoxyethyl methacrylate,
2-n-pentoxyethyl acrylate,
2-n-pentoxyethyl methacrylate,
2-n-hexoxyethyl acrylate,
2-n-hexoxyethyl methacrylate,
2-cyclohexoxyethyl acrylate,
2-cyclohexoxyethyl methacrylate,
2-n-heptoxyethyl acrylate,
2-n-heptoxyethyl methacrylate,
2-(2-ethylhexoxy)ethyl acrylate,
2-(2-ethylhexoxy)ethyl methacrylate,
2-n-decoxyethyl acrylate,
2-n-decoxyethyl methacrylate,
2-(2,2-dimethyldecoxy)ethyl acrylate,
2-(2,2-dimethyldecoxy)ethyl methacrylate,
2-n-eicosoxyethyl acrylate,
2-n-eicosoxyethyl methacrylate,
2-n-tetracosoxyethyl acrylate,
2-n-tetracosoxyethyl methacrylate,
2-n-heptacosoxyethyl acrylate,
2-n-heptacosoxyethyl methacrylate,
2-n-triacontoxyethyl acrylate,
2-n-triacontoxyethyl methacrylate, and the like.

The modifying copolymers employed in the instant invention contain from about 0.5 percent by weight to about 60 percent by weight, preferably from about 2.5 percent by weight to about 40 percent by weight, of polymerized vinylphosphine oxide, and from about 40 percent by weight to about 99.5 percent by weight, preferably from about 60 percent by weight to about 97.5 percent by weight, of polymerized ethylene or alkoxyethyl acrylate. Most preferably such copolymers contain from about 10 percent by weight to about 30 percent by weight of polymerized vinylphosphine oxide and from about 70 percent by weight to about 90 percent by weight of polymerized ethylene or alkoxyethyl acrylate.

The modifying copolymers employed in the instant invention can be prepared by copolymerizing a mixture of a vinylphosphine oxide with ethylene or an alkoxyethyl acrylate, by means of a catalyst capable of producing free radicals under the polymerization conditions employed. The monomer mixture can contain from about 0.1 percent by weight to about 70 percent by weight, or more, of the vinylphosphine oxide, and from about 30 percent by weight to about 99.9 percent by weight of the ethylene or alkoxyethyl acrylate. Preferably the mixture contains from about 1 percent by weight to about 50 percent by weight of the vinylphosphine oxide and from about 50 percent by weight to about 99 percent by weight of the ethylene or alkoxyethyl acrylate. The most preferred concentrations are from about 5 percent by weight to about 40 percent by weight of the vinylphosphine oxide and from about 60 percent by weight to about 90 percent by weight of the ethylene or alkoxyethyl acrylate.

When copolymerizing a vinylphosphine oxide with an alkoxyethyl acrylate, temperatures of from about $-80°$ C. to about 150° C., preferably from about 35° C. to about 100° C., are suitable, while temperatures of from about 40° C. to about 350° C. preferably from about 60° C. to about 200° C., are suitable when polymerizing the vinylphosphine oxide with ethylene. Atmospheric pressure is usually employed when copolymerizing the alkoxyethyl acrylate, although subatmospheric pressure or superatmospheric pressure can also be employed. When copolymerizing ethylene, pressures of from about 500 atmospheres to about 10,000 atmospheres, preferably from about 800 atmospheres to about 3000 atmospheres, are suitable.

The catalysts employed in effecting copolymerization are those capable of producing free radicals under the polymerization conditions employed. Among the compounds which can be employed as catalysts are oxygen, either alone or together with a trialkylboron, such as trimethylboron, triethylboron and tripropylboron; peroxides such as hydrogen peroxide, diethyl peroxide, dipropionyl peroxide, dilauroyl peroxide, dibutyrylperoxide, dibenzoyl peroxide, distearyl peroxide, di-tertiary-butyl peroxide, tertiary-butyl hydroperoxide, diacetyl peroxide, distearoyl peroxide, acetyl benzoyl peroxide, perbenzoic acid, perlauric acid, and peracetic acid; azo compounds such as $\alpha,\alpha'$-azo-bis-isobutyronitrile, 2,2'-dicyanoazobenzene and 2,2'-azo-bis(2-methylpropionitrile); percarbonates such as diisopropyl percarbonate and di-tertiary-butyl percarbonate; peresters such as tertiary-butyl perbenzoate and acetaldehyde monoperacetate; persulfates such as sodium persulfate, potassium persulfate and ammonium persulfate; perborates such as sodium perborate, potassium perborate and ammonium perborate; and compounds which together form redox type catalyst systems, such as a combination of ammonium persulfate and sodium bisulfite, or other combinations of oxidizing agents and reducing agents. These catalysts are employed in amounts which are conventionally employed in the art, either individually or in various mixtures thereof. Thus such catalysts can be employed in an amount of from about 0.001 percent by weight to about 5 percent by weight, preferably from about 0.01 percent by weight to about 2 percent by weight, of the total amount of comonomers present.

Copolymerization of a vinylphosphine oxide with ethylene or an alkoxyethyl acrylate can be carried out in a continuous manner or in a batchwise manner. The copolymerization can be carried on in bulk, in which extraneous diluents are absent; in solution, in which diluents which maintain the reactants and/or products in soluton are present; or in emulsion or suspension, in which diluents and additives to maintain the reaction in said conditions are present. In the last instances water, organic diluents, or combinations of water with organic diluents such as benzene, toluene, heptane, etc., are used, together with the emulsifying or suspending agents when desired.

The polypropylene and modifying copolymer can be blended together in amounts varying over rather wide ranges, with the minimum amount of copolymer depending upon the dyeability improvement desired, and the maximum amount limited solely by the compatibility and ease of compounding of the copolymer with the polypropylene. In general, amounts of copolymer of from about 1 percent by weight to about 80 percent by weight, based on the total weight of the mixture, give satisfactory results. Preferably, amounts of copolymer of from about 2 percent by weight to about 40 percent by weight, most preferably from about 5 percent by weight to about 30 percent by weight, based on the total weight of the mixture, are employed.

The dyeable compositions of the instant invention are especially useful in spinning fibers. Any conventional spinning technique, such as melt spinning or solution spinning, can be employed to produce such fibers. The fibers produced by such procedures can then be stretched by conventional means to orient the fiber molecules and produce fibers having desirable tensile properties.

The fibers produced from the compositions of this invention can be readily dyed by conventional dyeing techniques to produce much deeper shades of color than have heretofore been obtainable from unmodified polypropylene fibers. Among the dyes that can be employed for this purpose are the well known acid dyes, basic dyes, disperse dyes, soluble vat dyes, azoic dyes, premetallized dyes, and the like. In a typical dyeing procedure employing acid dyes and premetallized dyes, a 50 to 1 dye bath ratio (ratio of the total weight of liquid in the dye bath to the weight of fiber present) can be employed, with the bath containing 1 percent by weight of a methyl polyethanol quaternary amine, 2 percent by weight of sulfuric acid, and 3 percent by weight of the dye, all based on the weight of the fiber. The fiber is heated in the dye bath for about ninety minutes at the boil, and then rinsed, scoured, and dried. When a disperse dye is employed, dyeing can be effected in one hour at the boil in a bath having a dye bath ratio of about 40 to 1, and containing 1 percent of N-methyl-N-oleoyl taurate and 2 to 3 percent of the disperse dye. For basic dyes, dyeing can be effected in ninety minutes at the boil in a bath having a dye bath ratio of about 40 to 1, and containing 1 percent of an alkyl phenyl polyethylene glycol and 2 percent of the basic dye. If desired, known dye carriers can be employed in the bath to assist dyeing.

The amount of dye absorbed by the fiber, or its depth of color, is approximately proportional to, and can be measured by, the K/S value of the fiber, which is a measure of the light reflected by the dyed sample. The larger the K/S value, the deeper the shade, with a K/S value of 20 indicating a shade approximately twice as deep as the shade represented by a K/S value of 10. The K/S value of a sample is determined in accordance with the procedure set forth in an article by D. B. Judd, "Color In Business," Science and Industry, 1952, pages 314–342.

Among the dyes that can be employed in dyeing the compositions of the instant invention are the following:

Acid

Yellow:

| | C.I. |
|---|---|
| 1 | 10316 |
| 3 | 47005 |
| 7 | 56205 |
| 11 | 18820 |
| 23 | 19140 |
| 29 | 18900 |
| 36 | 13065 |
| 42 | 22910 |
| 54 | 19010 |
| 99 | 13900 |

Orange:

| | |
|---|---|
| 1 | 13090/1 |
| 7 | 15510 |
| 10 | 16230 |
| 24 | 20170 |
| 49 | 23260 |
| 72 | 18740 |
| 74 | 18745 |

Red:

| | |
|---|---|
| 1 | 18050 |
| 12 | 14835 |
| 14 | 14720 |
| 26 | 16150 |
| 34 | 17030 |
| 37 | 17045 |
| 73 | 27290 |
| 85 | 22245 |
| 89 | 23910 |
| 115 | 27200 |
| 116 | 26660 |
| 134 | 24810 |
| 179 | 19351 |
| 225 | |

Violet:

| | |
|---|---|
| 1 | 17025 |
| 7 | 18055 |
| 17 | 42650 |
| 43 | 60730 |

Blue:

| | |
|---|---|
| 1 | 42045 |
| 9 | 42090 |
| 22 | 42755 |
| 25 | 62055 |
| 59 | 50315 |
| 83 | 42660 |
| 102 | 50320 |

Acid—Continued

Green: | C.I.
--- | ---
1 | 10020
3 | 42085
16 | 44025
20 | 20495
50 | 44090

Brown:
14 ......... 20195
42 ......... 14251

Black:
1 ......... 20470
24 ......... 26370
48 ......... 65005
52 ......... 15711

Basic

Yellow:
1 ......... 49005
9 ......... 46040

Orange:
2 ......... 11270
12 ......... 46045

Red:
1 ......... 45160
9 ......... 42500

Violet:
1 ......... 42535
3 ......... 42555
14 ......... 42510

Blue:
4 ......... 51004
5 ......... 42140
7 ......... 42595
26 ......... 44045

Green:
4 ......... 42000

Brown:
2 ......... 21030

Disperse

Yellow:
1 ......... 10345
3 ......... 11855
31 ......... 48000

Orange:
1 ......... 11080
3 ......... 11005
7 ......... 11240

Red:
1 ......... 11110
4 ......... 60755
11 ......... 62015
13 ......... 11115
15 ......... 60710
17 ......... 11210

Violet:
1 ......... 61100
4 ......... 61105
8 ......... 62030
13 ......... 11195

Blue:
1 ......... 64500
3 ......... 61505
7 ......... 62500

Black:
1 ......... 11365
7 ......... 11035

Azoic diazo components

Diazo:
1 ......... 37135
2 ......... 37005
3 ......... 37010
4 ......... 37210
5 ......... 37125
6 ......... 37025
8 ......... 37110
10 ......... 37120
13 ......... 37130
20 ......... 37175
28 ......... 37151
32 ......... 37090
34 ......... 37100
35 ......... 37255
38 ......... 37190
41 ......... 37165
44 ......... 37000
48 ......... 37235

Azoic coupling components

Coupling:
2 ......... 37505
3 ......... 37575
5 ......... 37610
7 ......... 37565
10 ......... 37510
12 ......... 37550
13 ......... 37595
14 ......... 37558
17 ......... 37515
20 ......... 37530
29 ......... 37527
34 ......... 37531
36 ......... 37585

Soluble vat

Yellow:
2 ......... 67301
4 ......... 59101
5 ......... 56006

Orange:
1 ......... 59106
2 ......... 59706
5 ......... 73336

Red:
1 ......... 73361
10 ......... 67001

Violet:
1 ......... 60011
2 ......... 73386
3 ......... 73396

Blue:
1 ......... 73002
5 ......... 73066
6 ......... 69826
7 ......... 70306

Green:
1 ......... 59826
2 ......... 59831
3 ......... 69501

Brown:
1 ......... 70801
3 ......... 69016
5 ......... 73411

Black:
1 ......... 73671 and the like. The Colour Index (C.I.) numbers are those listed in the latest Colour Index.

The polypropylene compositions of this invention are readily extruded by conventional procedures to produce fibers, rods, films, and protective coatings. The films so obtained are amenable to printing by conventional procedures without any further surface treatment of the film being necessary.

The modifying copolymers added to the propylene polymers to produce the polypropylene compositions of this invention are readily compatible with the propylene polymers and relatively clear, tough compositions are obtained. These blends show little sweat-out on heating, good product uniformity, improved printability, reduced fibrillation, and many other desirable properties.

The copolymers themselves can be used to produce filaments, films, and molded and extruded shaped articles.

The copolymers can be liquid, wax-like, or solid, depending on the molecular weight as measured by specific viscosity. The solid copolymers have densities above about 0.91 gram/cc. and can be as high as 0.98 gram/cc. or more.

The following examples are set fourth for purposes of illustration so that those skilled in the art may better understand this invention, and it should be understood that they are not to be construed as limiting this invention in any manner. The following test procedures were employed in evaluating the products obtained:

Density.—A.S.T.M. D–1505–57T

Melt Index.—Determined in accordance with A.S.T.M. D–1238–52T but at 230° C.

Melt flow.—Determined in a manner similar to melt index but at 1.15 p.s.i. and 230° C.

Tenacity, elongation, and stiffness.—Measured on an Instrom Tensile Tester using a modified version of A.S.T.M. D–1380–55T test procedure in which a ten-inch yarn specimen is elongated at a rate of 60 percent per minute. The stiffness modulus is calculated at 100 times the stress at 1 percent elongation.

Reduced viscosity ($I_R$).—Determined by the equation $$I_R = \frac{\frac{\Delta N}{N_0}}{C}$$

wherein $\Delta N$ is the difference in seconds between the flow-time of a solution of polymer through a capillary viscometer and the flow-time of the solvent, $N_0$ represents the flow-time of the solvent, and $C$ is the concentration of polymer in said solution in grams per 100 milliliters of solvent. The value of $\Delta N/N_0$ is known as the specific viscosity.

EXAMPLE 1

A stainless steel lined autoclave having a volume of 1480 cc. was charged with 900 grams of benzene, 5 grams of vinyldibutylphosphine oxide and 0.5 gram of dibenzoyl peroxide. The reaction vessel was purged three times with ethylene and pressured to 3,000 p.s.i. with oxygen-free ethylene while agitating. After heat was applied to bring the temperature of the reaction mixture to 70° C., the pressure was elevated to 15,000 p.s.i. During the reaction time of four hours in which the temperature ranged from 86° C. to 91° C., the pressure was maintained within the range of 14,000 p.s.i. to 15,000 p.s.i. by periodic injection of ethylene. There was produced and recovered 15 grams of a solid copolymer of ethylene and vinyldibutylphosphine oxide having an 8 percent by weight content of polymerized vinyldibutylphosphine oxide therein. The copolymer had a specific viscosity of 0.121 (as measured at 80° C. from a solution of 0.4 gram per 100 cc. of methylcyclohexane), a density of 0.9439 g./cc., and a room temperature stiffness of 43,947 p.s.i.

In similar manner the copolymers of ethylene with vinyldiethylphosphine oxide or vinyldi-(2-ethylhexyl) phosphone oxide are produced by substitution of the respective comonomer in the initial feed to the autoclave.

EXAMPLE 2

In a manner similar to that described in Example 1, a copolymer of ethylene and vinyldibutylphosphine oxide was produced. The autoclave charged was 1,000 grams of distilled and deoxygenated water, 5 grams of vinyldibutylphosphine oxide and 1 gram of α,α′-azo-bis-isobutyronitrile. Ethylene was fed in to maintain a pressure of 14,000 p.s.i. to 15,000 p.s.i. at 65° C. to 76° C. for a reaction period of about three hours. There was produced 77 grams of the solid copolymer having a 2.9 percent by weight vinyldibutylphosphine oxide content, a specific viscosity of 0.280 (as measured at 80° C. from a solution of 0.4 gram per 100 cc. of methylcyclohexane), a density of 0.9286 g./cc., and a room temperature stiffness of 32,821 p.s.i.

EXAMPLE 3

In a manner similar to that described in Example 1, a copolymer of ethylene and vinyldibutylphosphine oxide was produced. The autoclave charged was 750 grams of distilled and deoxygenated water, 18.5 grams of vinyldibutylphosphine oxide and 1 gram of α,α′-azo-bis-isobutyronitrile. Ethylene was fed in to maintain a pressure of 14,100 p.s.i. to 15,000 p.s.i. at 69° C. to 70° C. for a reaction period of five hours. There was produced 40 grams of the solid copolymer having an 18.2 percent by weight vinyldibutylphosphine oxide content, a specific viscosity of 0.155 (as measured at 80° C. from a solution of 0.4 gram per 100 cc. of methylcyclohexane), a density of 0.9298 g./cc., and a room temperature stiffness of 20,580 p.s.i.

A blend was prepared by roll milling 90 parts by weight of polypropylene having a melt index of 4 dg./min. and a density of 0.91 gram/cc. with 10 parts by weight of the above copolymer. The blending was carried out at 170° C., and it was readily accomplished without any sign of incompatibility between the two polymers being observed. The blended composition was melt spun at 270° C. through a spinnerette having 25 holes, each 0.030 inch in diameter. The orifice velocity was 3.1 feet per minute and the take-up velocity was 465 feet per minute. The multifilament yarn was then stretched 229 percent in a steam atmosphere (Yarn I).

A control yarn (Yarn II) was spun in the same manner for comparison purposes using the same polypropylene. The properties of the yarns are summarized below:

| Yarn | I | II |
|---|---|---|
| Tenacity, g.p.d | 3.5 | 4.4 |
| Elongation, percent | 35 | 30 |
| Stiffness modulus, g.p.d | 33 | 38 |
| Shrinkage, percent in boiling water | 7.2 | 8 |

Samples of the above yarns were dyed by the previously indicated procedures. Yarn I was dyed to deep shades, whereas Yarn II showed negligible dyeability. The results are tabulated below.

| Yarn | K/S values | |
|---|---|---|
|  | I | II |
| Disperse Red 17 | 8.8 | 1.1 |
| Acid Red 225 | 7.4 | 1.3 |

In a similar manner blends of polypropylene and copolymers of ethylene with vinyldimethylphosphine oxide or vinyldi-(2-ethylhexyl)phosphine oxide or vinyldiheptylphosphine oxide or vinyldiphenylphosphine oxide produce filaments which are readily dyeable to deeper shades than polypropylene per se.

EXAMPLE 4

A blend was prepared as described in Example 3 by roll milling 70 parts by weight of polypropylene with 30 parts by weight of a 91.5/8.5 copolymer of ethylene/vinyldibutylphosphine oxide produced similarly to that in Example 3. The blended composition was converted to a 7 mils thick film by molding in a press at 140° C. at 400 p.s.i. pressure (Film I). A control film (Film II) was produced in the same manner for comparison purposes using the same polypropylene; and the two films were dyed by the previously indicated procedures. Film I was in all instances dyed to very deep shades with Disperse Red 17 and Acid Red 225. Upon cross-sectioning the film the dyeing was observed to be a uniform dyeing and not a surface phenomenon; Film II was not dyeable.

Films of blends of polypropylene and copolymers of ethylene with vinyldipropylphosphine oxide or vinyldi-(p-methylphenyl)phosphine oxide are also readily dyeable. In addition, the films are readily printable by conventional techniques used for printing on polyolefinic surfaces.

EXAMPLE 5

In a manner similar to that described in Example 3 an 81.9/18.1 ethylene/vinyldiphenylphosphine oxide copolymer was produced. A blend was prepared containing 90 parts by weight of polypropylene (melt index 4 dg./min. and density 0.91 gram/cc.) and 10 parts by weight of the ethylene/vinyldiphenylphosphine oxide copolymer and converted to 7 mils thick film as described in Example 4. The film produced from this blend was dyed to deep shades by Disperse Red 17 and Acid Red 225, whereas a control polypropylene film was not dyeable.

EXAMPLE 6

In a manner similar to that described in Example 3 an 81.5/18.5 ethylene/vinyldiphenylphosphine oxide copolymer was produced. A blend was prepared containing 90 parts by weight of polypropylene and 10 parts by weight of the ethylene/vinyldiphenylphosphine oxide copolymer and converted to 7 mils thick film as described in Example 4. The film produced from this blend was dyed to deep shades by Disperse Red 17 and Acid Red 225, whereas a control polypropylene film was not dyeable.

EXAMPLE 7

In a manner similar to that described in Example 1, a copolymer of ethylene and vinyldiphenylphosphine oxide was produced. The autoclave charge was 750 grams of benzene, 12.5 grams of vinyldiphenylphosphine oxide, and 10 milliliters of a 1 percent solution of di-tertiary-butyl peroxide in benzene. Ethylene was fed in to maintain a pressure of 13,000 p.s.i. to 15,000 p.s.i. at 180° C. to 186° C. for a reaction period of about five and one third hours. There was produced 63 grams of the solid copolymer having a 12.2 percent by weight vinyldiphenylphosphine oxide content, a specific viscosity of 0.105 in methylcyclohexane at 80° C., a density of 0.9396 gram/cc., and a room temperature stiffness of 16,054 p.s.i.

In a similar manner the copolymer is produced by continuously feeding a mixture of ethylene, vinyldiphenylphosphine oxide and catalyst into a conventional tubular reactor, at reactor pressures of about 20,000 p.s.i. to 25,000 p.s.i.

A blend was prepared, as described in Example 3, containing 90 parts by weight of polypropylene and 10 parts by weight of the above autoclave-produced copolymer. The blended composition was melt spun at 280° C. through a spinnerette having 25 holes, each 0.030 inch in diameter. The orifice velocity was 3.1 feet per minute and the take-up velocity was 620 feet per minute. The multifilament yarn was then stretched 240 percent in a steam atmosphere (Yarn III).

A second blend containing 15 parts by weight of the copolymer and 85 parts by weight of polypropylene was prepared and spun as described above with the sole exception that the multifilament yarn was steam stretched 225 percent (Yarn IV).

Samples of the above yarns were dyed as previously described and in both instances deep, bright shades were obtained. The results are tabulated below together with a control.

| Yarn | K/S values | | |
|---|---|---|---|
| | III | IV | II |
| Disperse Red 17 | 6.2 | 7.0 | 1.1 |
| Acid Red 225 | 5.3 | 8.1 | 1.3 |

EXAMPLE 8

In a manner similar to that described in Example 1, a copolymer of ethylene and vinyldiphenylphosphine oxide was produced. The autoclave charge was 750 grams of benzene, 6 grams of vinyldiphenylphosphine oxide, and 3 grams of α,α'-azo-bis-isobutyronitrile. Ethylene was fed in to maintain a pressure of 14,500 p.s.i. to 15,000 p.s.i. at 870° C. to 92° C. for a reaction period of six hours. There was produced 34 grams of the solid copolymer having a 9.9 percent vinyldiphenylphosphine oxide content, a specific viscosity of 0.075 (as measured at 80° C. from a solution of 0.4 gram per 100 cc. of methylcyclohexane), a density of 0.9648 gram/cc., and a room temperature stiffness of 55,493 p.s.i.

In a similar manner the copolymers of ethylene with vinyldi-(p-methylphenyl)phosphine oxide, or vinyldibenzylphosphine oxide, or vinyldinaphthylphosphine oxide are produced by substitution of the respective comonomer in the initial charge to the autoclave.

EXAMPLE 9

To a nitrogen-purged 300-milliliter pressure bottle were charged 58 grams of 2-n-butoxyethyl acrylate, 24 grams of magnesium chloride-vinyldiphenylphosphine oxide complex, 50 milliliters of anhydrous methanol, and 0.82 gram of 2,2'-azo-bis(2-methylpropionitrile). The bottle was then capped and rotated for 20 hours in a constant temperature bath which was maintained at 50° C. At the end of this time, the bottle was opened and the contents thereof was diluted with cold heptane in order to precipitate the desired copolymer. The copolymer was then washed three times with cold heptane, filtered, and dried under vacuum at a temperature of 40° C. for about 50 hours. About 40.8 grams of copolymer were recovered in this manner. The copolymer contained 20 percent by weight of the combined magnesium chloride-vinyldiphenylphosphine oxide complex, and 80 percent by weight of combined 2-n-butoxyethylacrylate. The copolymer had a reduced viscosity of 0.62 in benzene at 30° C. using a solution of 0.2 gram of polymer per 100 milliliters of solvent.

A blend of 10 parts by weight of the copolymer produced in accordance with the above procedure and 90 parts by weight of a polypropylene resin having a density of 0.91 gram/cc. and a melt flow of 4 decigrams/minute at 230° C. was produced by milling on an internally heated two-roll mill at 170° C. Various stabilizers were also incorporated during the milling so that the final blend contained 0.1 percent by weight of an amylphenol-formaldehyde resin antioxidant, 0.5 percent by weight of a diphenylpentaerithritol diphosphite antioxidant co-stabilizer, and 0.3 percent by weight of a commercially available benzotriazole type ultraviolet light absorber.

The blended composition was pressed into a film at a temperature of 150° C. to 160° C. Samples of the film were dyed with Dispersed Red 17 (C. I. 11210) and Acid Red 225 in accordance with the procedures set forth above. The Disperse Red dye produced a deep red shade in the film and the Acid Red produced a light-medium shade.

When the dyeings were repeated employing in the dye bath a commercially available aqueous emulsion of butyl benzoate as a dye carrier, in an amount equal to 20 percent by weight of the film present, deep shades of red were obtained with both dyes.

When vinyldiphenylphosphine oxide is employed instead of its magnesium chloride complex in the above procedure, similar results are obtained.

When the procedure was repeated with polypropylene film containing no modifying copolymer, only very slight staining of the film was obtained.

While the disclosure stresses polypropylene, it is to be noted that other polyolefins from mono-alpha-olefins having from 2 to about 10 carbon atoms can be substituted for polypropylene. For example, polyethylene, poly(butene - 1), poly(4 - methylbutene - 1), poly(hexene - 1), poly(decene-1), and the like, or mixtures thereof.

What is claimed is:

1. A dyeable composition comprising a blend of (A) a solid polypropylene, and (B) a copolymer of (1) a member selected from the group consisting of ethylene and an alkoxyethyl acrylate represented by the formula

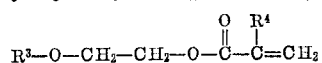

wherein $R^3$ is an alkyl radical containing from 1 to 30 carbon atoms and $R^4$ is a radical selected from the group consisting of hydrogen or methyl, and (2) a compound selected from the group consisting of compounds represented by the formulas

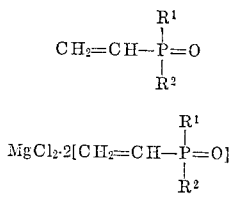

wherein $R^1$ and $R^2$ are monovalent hydrocarbon radicals free of aliphatic unsaturation containing from 1 to 14 carbon atoms.

2. A dyeable composition comprising a blend of (A) a solid polypropylene, and (B) a copolymer of (1) an alkoxyethyl acrylate represented by the formula

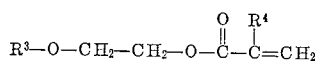

wherein $R^3$ is an alkyl radical containing from 1 to 30 carbon atoms and $R^4$ is a radical selected from the group consisting of hydrogen and methyl, and (2) a compound selected from the group consisting of compounds represented by the formulas

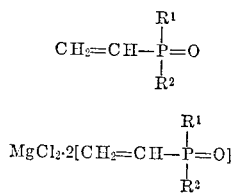

wherein $R^1$ and $R^2$ are monovalent hydrocarbon radicals free of aliphatic unsaturation containing from 1 to 14 carbon atoms.

3. A dyeable composition as in claim 2 comprising a blend of from about 20 percent by weight to about 99 percent by weight of polypropylene and from about 1 percent by weight to about 80 percent by weight of the copolymer, said copolymer having a polymerized alkoxyethyl acrylate content of from about 40 percent by weight to about 99.5 percent by weight and from about 0.5 percent by weight to about 60 percent by weight of the polymerized comonomer.

4. A dyeable composition as in claim 3 wherein $R^1$ and $R^2$ contain from 1 to 6 carbon atoms, and $R^3$ contains from 1 to 12 carbon atoms.

5. A dyeable composition as in claim 4 wherein the copolymer has a polymerized alkoxyethyl acrylate content of from about 60 percent by weight to about 97.5 percent by weight and from about 2.5 percent by weight to about 40 percent by weight of the polymerized comonomer.

6. A dyeable composition as in claim 3 comprising a blend of from about 60 percent by weight to about 98 percent by weight of polypropylene and from about 2 percent by weight to about 40 percent by weight of the copolymer.

7. A dyeable composition as in claim 6 wherein $R^1$ and $R^2$ contain from 1 to 6 carbon atoms, and $R^3$ contains from 1 to 12 carbon atoms.

8. A dyeable composition as in claim 7 wherein the copolymer has a polymerized alkoxyethyl acrylate content of from about 60 percent by weight to about 97.5 percent by weight and from about 2.5 percent by weight to about 40 percent by weight of the polymerized comonomer.

9. A dyeable composition as in claim 2 comprising a blend of from about 70 percent by weight to about 95 percent by weight of polypropylene and from about 5 percent by weight to about 30 percent by weight of the copolymer, said copolymer having a polymerized alkoxyethyl acrylate content of from about 70 percent by weight to about 90 percent by weight and from about 10 percent by weight to about 30 percent by weight of the polymerized comonomer.

10. A dyeable composition as in claim 9 wherein $R^1$ and $R^2$ contain from 1 to 6 carbon atoms, and $R^3$ contains from 1 to 12 carbon atoms.

11. A dyeable composition comprising a blend of (A) from about 60 percent by weight to about 98 percent by weight of a solid polypropylene, and (B) from about 2 percent by weight to about 40 percent by weight of a copolymer of (1) an alkoxyethyl acrylate represented by the formula

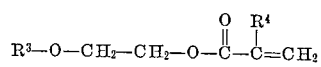

wherein $R^3$ is an alkyl radical containing from 1 to 30 carbon atoms and $R^4$ is a radical selected from the group consisting of hydrogen and methyl, and (2) a compound represented by the formula

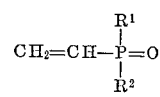

wherein $R^1$ and $R^2$ are monovalent hydrocarbon radicals free of aliphatic unsaturation containing from 1 to 14 carbon atoms, said copolymer having a polymerized alkoxyethyl acrylate content of from about 60 percent by weight to about 97.5 percent by weight and from about 2.5 percent by weight to about 40 percent by weight of the polymerized comonomer.

12. A dyeable composition as in claim 11 comprising a blend of from about 70 percent by weight to about 95 percent by weight of polypropylene and from about 5 percent by weight to about 30 percent by weight of the copolymer, $R^1$ and $R^2$ contain from 1 to 6 carbon atoms, $R^3$ contains from 1 to 12 carbon atoms, and said copolymer having a polymerized alkoxyethyl acrylate content of from about 70 percent by weight to about 90 percent by weight and from about 10 percent by weight to about 30 percent by weight of the polymerized comonomer.

13. A dyeable composition comprising a blend of (A) from about 60 percent by weight to about 98 percent by weight of a solid polypropylene, and (B) from about 2 percent by weight to about 40 percent by weight of a copolymer of (1) an alkoxyethyl acrylate represented by the formula

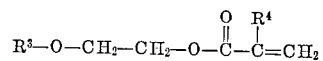

wherein $R^3$ is an alkyl radical containing from 1 to 30 carbon atoms and $R^4$ is a radical selected from the group consisting of hydrogen and methyl, and (2) a compound represented by the formula

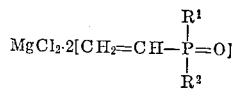

wherein $R^1$ and $R^2$ are monovalent hydrocarbon radicals free of aliphatic unsaturation containing from 1 to 14 carbon atoms, said copolymer having a polymerized alkoxyethyl acrylate content of from about 60 percent by weight to about 97.5 percent by weight and from about 2.5 percent by weight to about 40 percent by weight of the polymerized comonomer.

14. A dyeable composition as in claim 13 comprising a blend of from about 70 percent by weight to about 95 percent by weight of polypropylene and from about 5 percent by weight to about 30 percent by weight of the copolymer, $R^1$ and $R^2$ contain from 1 to 6 carbon atoms, $R^3$ contains from 1 to 12 carbon atoms, and said copolymer having a polymerized alkoxyethyl acrylate content of from about 70 percent by weight to about 90 percent by weight and from about 10 percent by weight to about 30 percent by weight of the polymerized comonomer.

15. A dyeable composition as in claim 13 wherein the copolymer is a copolymer of 2-n-butoxyethyl acrylate and magnesium chloride-vinyldiphenylphosphine oxide complex.

16. A dyeable composition as in claim 14 wherein the copolymer is a copolymer of 2-n-butoxyethyl acrylate and magnesium chloride-vinyldiphenylphosphine oxide complex.

17. The composition of claim 12 in the form of a filament.

18. The composition of claim 12 in the form of a film.

19. The composition of claim 14 in the form of a filament.

20. The composition of claim 14 in the form of a film.

21. The composition of claim 16 in the form of a filament.

22. The composition of claim 16 in the form of a film.

23. A dyeable composition comprising a blend of (A) from about 20 percent by weight to about 99 percent by weight of a solid polypropylene and (B) from about 1 percent by weight to about 80 percent by weight of a copolymer of ethylene and a compound selected from the group consisting of compounds represented by the formulas

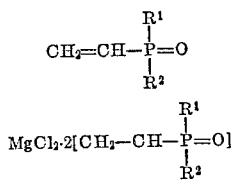

wherein $R^1$ and $R^2$ are monovalent hydrocarbon radicals free of aliphatic unsaturation containing from 1 to 14 carbon atoms, said copolymer having a polymerized ethylene content of from about 40 percent by weight to about 99.5 percent by weight and from about 0.5 percent by weight to about 60 percent by weight of the polymerized comonomer.

24. A dyeable composition comprising a blend of (A) from about 20 percent by weight to about 99 percent by weight of a solid polypropylene and (B) from about 1 percent by weight to about 80 percent by weight of a copolymer of ethylene and a vinylphosphine oxide represented by the formula

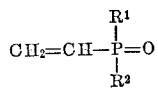

wherein $R^1$ and $R^2$ are monovalent hydrocarbon radicals free of aliphatic unsaturation containing from 1 to 14 carbon atoms, said copolymer having a polymerized ethylene content of from about 40 percent by weight to about 99.5 percent by weight and from about 0.5 percent by weight to about 60 percent by weight of polymerized vinylphosphine oxide.

25. A dyeable composition as in claim 24 wherein $R^1$ and $R^2$ contain from 1 to 6 carbon atoms.

26. A dyeable composition as in claim 25 comprising a blend of from about 60 percent by weight to about 98 percent by weight of polypropylene and from about 2 percent by weight to about 40 percent by weight of the copolymer, said copolymer having a polymerized ethylene content of from about 60 percent by weight to about 97.5 percent by weight and from about 2.5 percent by weight to about 40 percent by weight of polymerized vinylphosphine oxide.

27. A dyeable composition as in claim 26 comprising a blend of from about 70 percent by weight to about 95 percent by weight of polypropylene and from about 5 percent by weight to about 30 percent by weight of the copolymer, said copolymer having a polymerized ethylene content of from about 70 percent by weight to about 90 percent by weight and from about 10 percent by weight to about 30 percent by weight of polymerized vinylphosphine oxide.

28. The composition of claim 24 wherein component (B) is a copolymer of ethylene and vinyldibutylphosphine oxide.

29. The composition of claim 24 in the form of a filament.

30. The composition of claim 28 in the form of a filament.

31. The composition of claim 24 in the form of a film.

32. The composition of claim 28 in the form of a film.

33. The composition of claim 24 wherein component (B) is a copolymer of ethylene and vinyldiphenylphosphine oxide.

34. The composition of claim 33 in the form of a filament.

35. The composition of claim 33 in the form of a film.

References Cited

UNITED STATES PATENTS 3,035,096   5/1962   Cooper _____ 260—605

SAMUEL H. BLECH, *Primary Examiner.*

C. J. SECCURO, *Assistant Examiner.*

U.S. Cl. X.R.

8—4, 55; 260—86.1, 88.1, 606.5